(12) United States Patent
Fong

(10) Patent No.: US 7,033,160 B2
(45) Date of Patent: Apr. 25, 2006

(54) CONVECTION COOLING TECHNIQUES IN SELECTIVE DEPOSITION MODELING

(75) Inventor: Jon Jody Fong, Calabasas, CA (US)

(73) Assignee: 3D Systems, Inc., Valencia, CA (US)

(*) Notice: Subject to any disclaimer, the term of this patent is extended or adjusted under 35 U.S.C. 154(b) by 197 days.

(21) Appl. No.: 10/157,575

(22) Filed: May 28, 2002

(65) Prior Publication Data

US 2003/0224081 A1    Dec. 4, 2003

(51) Int. Cl.
B29C 35/08    (2006.01)

(52) U.S. Cl. .................... 425/174.4; 62/408; 62/412

(58) Field of Classification Search ............ 425/174.4; 62/407, 408, 409, 410, 411, 412
See application file for complete search history.

(56) References Cited

U.S. PATENT DOCUMENTS

| | | | |
|---|---|---|---|
| 4,934,920 A * | 6/1990 | Yamauchi et al. ............. 425/73 |
| 4,967,832 A | 11/1990 | Porter ......................... 156/387 |
| 5,136,515 A | 8/1992 | Helinski ...................... 700/119 |
| 5,204,055 A | 4/1993 | Sachs et al. .................... 419/2 |
| 5,216,616 A | 6/1993 | Masters ....................... 264/401 |
| 5,322,651 A * | 6/1994 | Emmer ........................ 264/410 |
| 5,340,433 A | 8/1994 | Crump ......................... 156/578 |
| 5,380,769 A | 1/1995 | Titterington et al. ......... 523/161 |
| 5,555,176 A | 9/1996 | Menhennett et al. ........ 700/118 |
| 5,855,836 A | 1/1999 | Leyden et al. ............... 264/401 |
| 5,866,058 A | 2/1999 | Batchelder et al. ......... 264/237 |
| 6,133,355 A | 10/2000 | Leyden et al. ............... 524/277 |
| 6,253,834 B1 | 7/2001 | Sterner ........................ 165/80.3 |
| 6,259,962 B1 | 7/2001 | Gothait ........................ 700/119 |
| 6,576,872 B1 * | 6/2003 | Bertero ........................ 219/388 |
| 2002/0016386 A1 | 2/2002 | Napadensky | |

FOREIGN PATENT DOCUMENTS

| | | |
|---|---|---|
| EP | 0 998 180 A2 | 5/2000 |
| WO | WO 97/11837 A1 | 4/1997 |
| WO | WO 00/11092 A1 | 3/2000 |
| WO | WO 01/26023 A1 | 4/2001 |
| WO | WO 01/68375 A2 | 9/2001 |

OTHER PUBLICATIONS

U.S. Appl. No. 09/970,956, filed Oct. 3, 2001, Vamon et al.

(Continued)

Primary Examiner—Duane Smith
Assistant Examiner—Emmanuel S. Luk
(74) Attorney, Agent, or Firm—James E. Curry; Ralph D'Alessandro

(57) ABSTRACT

A convection cooling technique for selective deposition modeling utilizing a venturi duct to establish a low-pressure port for drawing a second flow of air into the duct. The second flow of air is drawn across a heat generating component in the selective deposition modeling apparatus. A low-pressure zone is established at the low-pressure port sufficient to meet the head loss that results when drawing the second flow across the heat generating component and into the venturi duct. A desired flow rate is achieved at a pressure drop that is greater than that possible by the direct use of a fan. The cooling system is well suited for use in providing steady state cooling of radiation exposure systems used in selective deposition modeling to initiate curing of the layers of dispensed material.

8 Claims, 4 Drawing Sheets

OTHER PUBLICATIONS

U.S. Appl. No. 09/971,247, filed Oct. 3, 2001, Schmidt et al.
U.S. Appl. No. 09/971,337, filed Oct. 3, 2001, Schmidt.
U.S. Appl. No. 10/140,426, filed May 7, 2002, Sherwood.
Article entitled, "A Novel Electronic Cooling Concept," by R. Ponnappan and J. E. Bean, published at http://asp.nerac.com/caccess/WNDABSM?SESSION=D70816D70816D90033028F&STITEM=0004&A dated May 1, 2002.
Article entitled, "Thermal Management Research Studies, vol. 1. Electronics," by R. Ponnappan, published at http://asp.nerac.com/caccess/WNDABSM?SESSION=D70816D90033028F&ndn=013036157852 dated May 1, 2002.
Article entitled, "Efficient Cooling of MCT and IGBT Using Venturi Flow," by P. R. Ponnappan, J. E. Leland, J. E. Beam, G. Fronista, and J. A. Weimer, published at http://asp.nerac.com/caccess/WNDABSM?SESSION=D70816D90033028F&ndn=108062198250 dated May 1, 2002.
Article entitled, "Analysis of Conjugate Heat Transfer in a Venturi-Based Cooling System for High Heat-Flux Sources," by V. Shanmugasundaram, J.E. Leland, J.E. Beam, and R. Ponnappan, published at http://asp.nerac.com/caccess/WNDABSM?SESSION=D70816D90033028F&ndn=108062195698 dated May 1, 2002.
Article entitled, "Active Cooling of MCT Using Venturi Flow," by R. Ponnappan, J. E. Leland, W.S. Chang, J.E. Beam, B.T. Nguyen, and J.A. Weimer, published at http://asp.nerac.com/caccess/WNDABSM?SESSION=D70816D90033028F&ndn=108059377165 dated May 1, 2002.

* cited by examiner

CONVECTION COOLING TECHNIQUES IN SELECTIVE DEPOSITION MODELING

BACKGROUND OF THE INVENTION

1. Field of the Invention

The invention relates in general to solid deposition modeling, and in particular to a method and apparatus for providing steady state convection cooling in solid deposition modeling apparatus for a heat generating component such as a radiation emitting lamp.

2. Description of the Prior Art

Recently, several new technologies have been developed for the rapid creation of models, prototypes, and parts for limited run manufacturing. These new technologies are generally called Solid Freeform Fabrication techniques, and are herein referred to as "SFF." Some SFF techniques include stereolithography, selective deposition modeling, laminated object manufacturing, selective phase area deposition, multi-phase jet solidification, ballistic particle manufacturing, fused deposition modeling, particle deposition, laser sintering, and the like. Generally in SFF techniques, complex parts are produced from a modeling material in an additive fashion as opposed to conventional fabrication techniques, which are generally subtractive in nature.

In most SFF techniques, structures are formed in a layer by layer manner by solidifying or curing successive layers of a build material. For example, in stereolithography a tightly focused beam of energy, typically in the ultraviolet radiation band, is scanned across a layer of a liquid photopolymer resin to selectively cure the resin to form a structure. In Selective Deposition Modeling, herein referred to as "SDM," a build material is typically jetted or dropped in discrete droplets, or extruded through a nozzle, in order to solidify on contact with a build platform or previous layer of solidified material in order to build up a three-dimensional object in a layerwise fashion. Other synonymous names for SDM which are used in this industry are solid object imaging, solid object modeling, fused deposition modeling, selective phase area deposition, multi-phase jet modeling, three-dimensional printing, thermal stereolithography, selective phase area deposition, ballistic particle manufacturing, fused deposition modeling, and the like. Ballistic particle manufacturing is disclosed in, for example, U.S. Pat. No. 5,216,616 to Masters. Fused deposition modeling is disclosed in, for example, U.S. Pat. No. 5,340,433 to Crump. Three-dimensional printing is disclosed in, for example, U.S. Pat. No. 5,204,055 to Sachs et al. Often a thermoplastic material having a low-melting point is used as the solid modeling material in SDM, which is delivered through a jetting system such as an extruder or print head. One type of SDM process which extrudes a thermoplastic material is described in, for example, U.S. Pat. No. 5,866,058 to Batchelder et al. One type of SDM process utilizing ink jet print heads is described in, for example, U.S. Pat. No. 5,555,176 to Menhennett et al.

Recently, there has developed an interest in utilizing curable materials in SDM. One of the first suggestions of using a radiation curable build material in SDM is found in U.S. Pat. No. 5,136,515 to Helinski, wherein it is proposed to selectively dispense a UV curable build material in an SDM system. Some of the first UV curable material formulations proposed for use in SDM systems are found in Appendix A of International Patent Publication No. WO 97/11837, where three reactive material compositions are provided. More recent teachings of using curable materials in various selective deposition modeling systems are provided in U.S. Pat. No. 6,259,962 to Gothait; U.S. Pat. No. 5,380,769 to Titterington et al; U.S. Pat. Nos. 6,133,355 and 5,855,836 to Leyden et al; U.S. Pat. App. Pub. No. US 2002/0016386 A1; and International Publication Numbers WO 01/26023, WO 00/11092, and WO 01/68375.

These curable materials generally contain photoinitiators and photopolymers which, when exposed to ultraviolet radiation (UV), begin to cross-link and solidify. As this occurs, a significant amount of exothermic heat is produced, which must be removed from the system as objects are built. For SDM systems that selectively dispense these curable materials, a UV radiation curing step is needed to cure the materials. However, UV exposure systems themselves generate significant amounts of heat, whether they are pulse flash systems or continuous flood systems. Undesirably, the high levels of heat generated by these lamps pose significant problems in SDM. Being able to remove this heat in an SDM apparatus in a steady state manner is critical to successful operation of the SDM system.

Thus, there is a need to develop a cooling system for use in an SDM apparatus capable of removing large amounts of localized heat, such as that generated by radiation exposure systems. These and other difficulties of the prior art have been overcome according to the present invention.

BRIEF SUMMARY OF THE INVENTION

The present invention provides its benefits across a broad spectrum. While the description which follows hereinafter is meant to be representative of a number of such applications, it is not exhaustive. As will be understood, the basic methods and apparatus taught herein can be readily adapted to many uses. It is intended that this specification and the claims appended hereto be accorded a breadth in keeping with the scope and spirit of the invention being disclosed despite what might appear to be limiting language imposed by the requirements of referring to the specific examples disclosed.

It is one aspect of the present invention to utilize convection heat transfer with a gas medium to remove large amounts of localized heat generated in an SDM apparatus.

It is another aspect of the present invention to use a first gas flow to establish a low-pressure zone which draws a second gas flow into the low pressure zone.

It is a feature of the present invention to direct a second gas flow over a heat generating component in an SDM apparatus to achieve steady state cooling of the component.

It is another feature of the present invention to use ambient air as the gas flow medium to remove large amounts of localized heat generated from a flash exposure system in an SDM apparatus.

It is an advantage of the present invention that steady state heat transfer for a flash exposure system in an SDM apparatus can be provided without using a liquid heat transfer medium.

It is another advantage of the present invention that a convection gas flow rate can be established that is greater than the gas flow rate possible when directly using high velocity fans to generate the gas flow.

These and other aspects, features, and advantages are achieved/attained in the method and apparatus of the present invention. A selective deposition modeling apparatus of the present invention comprises a support means, a dispensing means, a flash exposure means, and a cooling system for providing steady state cooling of the flash exposure means. The support means is affixed to the apparatus for supporting a three-dimensional object being built in the build environment. The dispensing means is affixed to the apparatus and in communication with the support means for dispensing the curable material in the build environment according to computer data to form the layers of the three-dimensional object. The flash exposure means is affixed to the apparatus and is in communication with the support means for curing the dispensed material.

The cooling system comprises an air-moving device creating a first flow of air and a venturi duct for receiving the first flow of air. The venturi duct has an inlet end, an exit end, and a restriction chamber between the inlet end and the exit end. The first flow of air establishes a low-pressure zone in the restriction chamber. A port is provided in communication with the restriction chamber and operatively engages the low-pressure zone. The port draws a second flow of air across the flash exposure means and into the venturi duct at a flow rate that substantially provides steady state cooling of the heat generating component.

A method for cooling a heat generating component used in a SDM apparatus by convection according to the present invention comprises the steps of generating a first flow of air from a air-moving device, delivering the first flow of air to an venturi duct, establishing a low-pressure zone in the restriction chamber of the venturi duct, providing a port in the restriction chamber operatively engaging the low-pressure zone, drawing a second flow of air into the venturi duct through the port, and directing the second flow of air across the heat generating component. The venturi duct has an inlet end, an exit end, and a restriction chamber between the inlet end and the exit end. The venturi duct receives the first flow of air at the inlet end and exhausts the first flow of air at the exit end. The second flow of air is drawn across the heat generating component at a flow rate that substantially provides steady state cooling of the heat generating component.

BRIEF DESCRIPTION OF THE DRAWINGS

The aspects, features, and advantages of the present invention will become apparent upon consideration of the following detailed disclosure of the invention, especially when it is taken in conjunction with the accompanying drawings wherein.

To facilitate understanding, identical reference numerals have been used, where possible, to designate identical elements that are common in the figures.

DETAILED DESCRIPTION OF THE PREFERRED EMBODIMENTS

Figure 1:
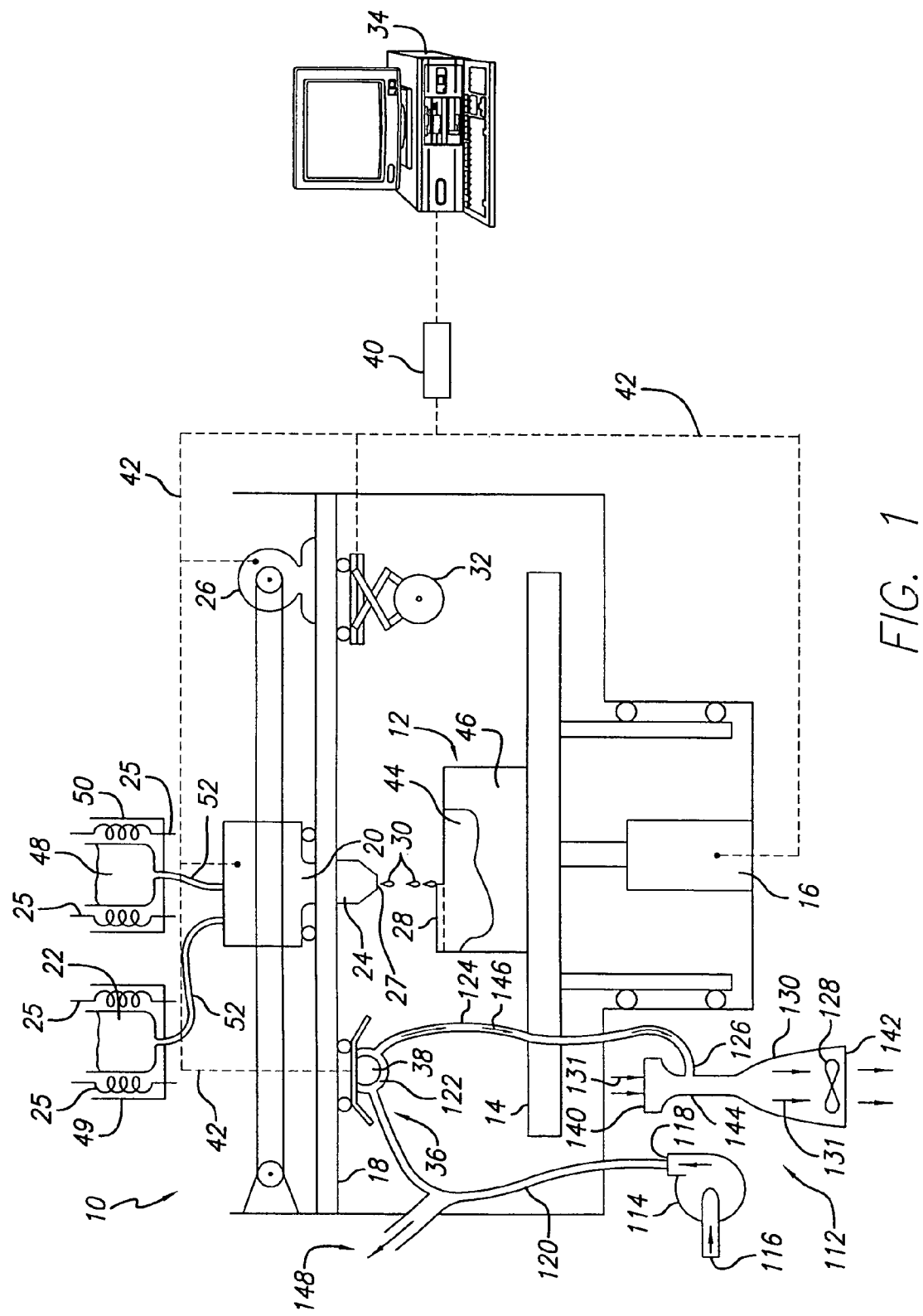
FIG. 1 is a diagrammatic side view of a solid deposition modeling apparatus incorporating the present invention flash exposure system.

While the convection cooling technique of the present invention is applicable to all SFF techniques requiring the removal of large amounts of localized heat by convection heat transfer, the invention will be described with respect to an SDM apparatus having a flash exposure system and utilizing an ink jet print head dispensing a curable phase change material. The convection cooling technique utilizes air as a gas medium to provide steady state cooling of a flash lamp in a flash exposure system, although other gas media could be used. However, it is to be appreciated that the cooling technique can be adapted for use with any SFF technique that has at least one heat generating component. Further the heat generating component need not be a flash lamp, but may be a continuous emission lamp, or other heat generating device such as a power supply.

As used herein, the term "a flowable state" of a build material is a state wherein the material is unable to resist shear stresses that are induced by a dispensing device, such as those induced by an ink jet print head when dispensing the material, causing the material to move or flow. Preferably, the flowable state of the build material is a liquid state, however, the flowable state of the build material may also exhibit thixotropic-like properties. The term "solidified" and "solidifiable" as used herein refer to the phase change characteristics of a material where the material transitions from the flowable state to a non-flowable state. A "non-flowable state" of a build material is a state wherein the material is sufficiently self-supportive under its own weight so as to hold its own shape. A build material existing in a solid state, a gel state, or paste state, are examples of a non-flowable state of a build material for the purposes herein. In addition, the term "cured" or "curable" refers to any polymerization reaction. Preferably, the polymerization reaction is triggered by controlled exposure to actinic radiation or thermal heat. Most preferably, the polymerization reaction involves the cross-linking of monomers and oligomers initiated by exposure to actinic radiation in the ultraviolet wavelength band. Further, the term "cured state" refers to a material, or portion of a material, in which the polymerization reaction has substantially completed. It is to be appreciated that as a general matter the material can easily transition between the flowable and non-flowable state prior to being cured; however, once cured, the material cannot transition back to a flowable state and be dispensed by the apparatus.

As used herein, the "duty cycle" of the flash exposure system refers to the percentage of the total amount of time the planar flash (or flashes) remains on for forming a layer compared to the total time it takes to form the layer.

The SDM apparatus incorporating the present invention system dispenses a curable phase change material from a Z850 piezoelectric ink jet print head available from Xerox Corporation of Wilsonville, Oreg., although other dispensing devices could be used, if desired. The material dispensed from the Z850 print head desirably has a viscosity of between about 13 to about 14 centipoise at a dispensing temperature of about 80° C. The dispensing methodology of this system is described in greater detail in U.S. patent application Ser. No. 09/971,337, assigned to the assignee of the present invention.

A number of radiation curable phase change formulations were developed to be dispensed by the Z850 print head to form three-dimensional objects. An exemplary build material formulation comprises 6.5% by weight Urethane Acrylate (CN980), 6.0% by weight Epoxy Acrylate (E3200), 18.7% by weight Urethane Acrylate (CN2901), 41.05% by weight Triethylene glycol dimethacrylate (SR205), 12.0% by weight Polypropylene Glycol Monomethacrylate (SR604), 10.0% by weight Urethane Wax (ADS038), 2.0% by weight Urethane Wax (ADS043), and 3.75% by weight Photo-initiator (I-184). The components CN 980, CN2901, SR 205, SR604, and SR 493D are available from Sartomer Company, Inc. of Exton Pa. The components ADS038 and ADS043 are available from American Dye Source, Inc. of Quebec, Canada. The component E3200 is available from UCB Chemical, Inc. of Atlanta, Ga., and the component I-184 is available from Ciba Specialty Chemicals, Inc. of New York, N.Y.

An exemplary non-curable phase change support material formulation comprises 70% by weight octadecanol available from Ruger Chemical Co., Inc., of Irvington, N.J., and 30% by weight of a tackifier sold under the designation of KE 100 available from Arakawa Chemical (USA) Inc., of Chicago, Ill. Further details pertaining to the build and support materials are found in U.S. patent application Ser. No. 09/971,247, assigned to the assignee of the present invention.

Referring particularly to FIG. 1 there is illustrated generally by the numeral 10 an SDM apparatus incorporating a flash exposure system illustrated generally by numeral 36. In this SDM apparatus, the flash exposure system 36 generates significant amounts of localized heat that is removed by the cooling system of the present invention, illustrated generally by numeral 112. The SDM apparatus 10 is shown building a three-dimensional object 44 on a support structure 46 in a build environment shown generally by the numeral 12. The object 44 and support structure 46 are built in a layer by layer manner on a build platform 14 that can be precisely positioned vertically by any conventional actuation means 16. Directly above and parallel to the platform 14 is a rail system 18 on which a material dispensing trolley 20 resides carrying a dispensing device 24. Preferably, the dispensing device 24 is the Z850 piezoelectric ink jet print head that dispenses the build material and the support material. However, other ink jet print head types could be used, such as an acoustic or electrostatic type, if desired. Alternatively a thermal spray nozzle could be used instead of an ink jet print head, if desired.

The trolley carrying the print head 24 is fed the curable phase change build material 22 from a remote reservoir 49. The remote reservoir is provided with heaters 25 to bring and maintain the curable phase change build material in a flowable state. Likewise, the trolley carrying the print head 24 is also fed the non-curable phase change support material 48 from remote reservoir 50 in the flowable state. In order to dispense the materials, a heating means is provided to initially heat the materials to the flowable state, and to maintain the materials in the flowable state along its path to the print head. The heating means comprises heaters 25 on both reservoirs 49 and 50, and additional heaters (not shown) on the umbilicals 52 connecting the reservoirs to the print head 24. Located on the print head 24 is a plurality of discharge orifices 27 for dispensing both the build material and support material, although just one is shown in FIG. 1.

In one embodiment the dispensing device 24 is reciprocally driven on the rail system 18 along a horizontal path by a conventional drive means 26 such as an electric motor. Generally, the trolley carrying the dispensing device 24 takes multiple passes to dispense one complete layer of the materials from the discharge orifices 27. In FIG. 1, a portion of a layer 28 of dispensed build material is shown as the trolley has just started its pass from left to right. Dispensed droplets 30 are shown in mid-flight, and the distance between the discharge orifice and the layer 28 of build material is greatly exaggerated for ease of illustration. The layer 28 may be all build material, all support material, or a combination of build and support material, as needed, in order to form and support the three-dimensional object.

The initial layer thickness established during dispensing is greater than the final layer thickness, and a planarizer 32 is drawn across the layer to smooth the layer and normalize the layer to establish the final layer thickness. The planarizer 32 is used to normalize the layers as needed in order to eliminate the accumulated effects of drop volume variation, thermal distortion, and the like, which occur during the build process. The planarizer 32 may be mounted to the material dispensing trolley 20 if desired, or mounted separately on the rail system 18, as shown.

A waste collection system (not shown in FIG. 1) is used to collect the excess material generated during planarizing. The waste collection system may comprise an umbilical that delivers the material to a waste tank or waste cartridge, if desired. A preferred waste system for curable phase change materials is disclosed in U.S. patent application Ser. No. 09/970,956 assigned to the assignee of the present invention, and discussed herein in conjunction with FIG. 2.

Preferably, an external computer 34 generates or is provided with a solid modeling CAD data file containing three-dimensional coordinate data of an object to be formed. Typically the computer 34 converts the data of the object into surface representation data, most commonly into the STL file format and also establishes support region data for the object. When a user desires to build an object, a print command is executed at the external computer in which the STL file is processed, through print client software, and sent to the computer controller 40 of the SDM apparatus 10 as a print job. The processed data transmitted to the computer controller 40 can be sent by any conventional data transferable medium desired, such as by magnetic disk tape, microelectronic memory, network connection, or the like. The computer controller processes the data and executes the signals that operate the apparatus to form the object. The data transmission route and controls of the various components of the SDM apparatus are represented as dashed lines at 42.

In FIG. 1, the flash exposure system generally shown by numeral 36 and is mounted on rail system 18. The flash exposure system 36 is reciprocally driven along rail system 18 to scan the radiation source over a just dispensed layer of material. The flash exposure system 36 includes a radiation emitting lamp 38 which is used to provide a planar (flood) exposure of UV radiation to each layer as needed. The lamp 38 generates a large amount of localized heat when flashed, and this heat is removed by the cooling system of the present invention, generally illustrated by numeral 112. The flash exposure system 36 is discussed in greater detail in conjunction with FIG. 3.

In FIG. 1, the cooling system of the present invention 112 shown in conjunction with the SDM apparatus 10. The cooling system 112 comprises a fan 114 having an air inlet 116 for receiving air and an air outlet 118 for supplying the air to air duct 120. The fan 114 delivers air from outside the apparatus 10 which is delivered to air duct 120 and to other systems in the apparatus, as identified generally by numeral 148. The air duct 120 is in communication with chamber 122, which makes air available for cooling the lamp 38. It is to be appreciated that fan 114 does not establish the desired flow rate of air through the chamber 122 to cool the lamp 38. Instead, the fan 114 provides air from outside the apparatus to be drawn into air inlet 116, which is accessed to cool the lamp 38. It is important to utilize outside air to cool the lamp 38, because the air inside the apparatus may include vapors of the curable build material. If these vapors were passed through the chamber 122, over time the vapors could accumulate and be cured inside the chamber 122 and on the lamp 38. This type of accumulated contamination would gradually reduce the radiation emission from the flash curing system 36 that could eventually render the system inoperative. Thus, outside air is used for cooling the lamp 38 to eliminate the potential of curing contaminate matter inside the chamber 122. Alternatively, air from inside the apparatus 10 could be used to cool the lamp 38, provided it is filtered to remove any vapors of the curable build material that may be present. An activated charcoal filter could be used to remove any vapors from the air prior to using the air to cool the lamp 38, if desired, such as the AQF® media filter line available from AQF Technologies, LLC, of Charlotte, N.C.

The desired flow rate of air is established by the provision of a low-pressure zone at a low-pressure port 126 that is connected to the chamber 122 via air duct 124. It is the low-pressure zone, which draws the second flow of air across the lamp 38 and through the chamber 122, that establishes the desired flow rate to cool the lamp 38. The low-pressure zone is established by providing an air-moving device 128 that creates a first flow of air 131 that travels through a venturi duct 130. This first flow of air does not pass over the lamp 38 and therefore does not provide any cooling for the lamp. The venturi duct 130 has an inlet end 140, an exit end 142, and a restriction chamber or throat 144 wherein the low-pressure zone is established. Preferably the cross-section shape of the restriction chamber or throat 144 is a circle having a specific diameter. The port 126, which is in communication with the restriction chamber 144 and the low-pressure zone, therein draws a second flow of air 146 into the venturi duct 130. It is this second flow of air 146 that is drawn through chamber 122 that provides steady state cooling of the lamp 38. The second flow of air 146 has an associated pressure drop between the lamp 38 and the restriction chamber 144, and the fan 128, or air moving device, is unable to achieve a head loss equal to the pressure drop of the second flow of air at the same flow rate of the second flow of air. However, the low-pressure zone established by the venturi duct 130 and air-moving device 128 establishes the second flow of air at a substantially increased flow rate which is not achievable with high flow rate fans ducted directly to the chamber 122. This is because most high flow rate fans are unable to achieve a high flow rate in ducting systems that have high pressure losses (head loss) due to, for example, a small cross-sectional area in the ducting. The cooling system 112 of the present invention is discussed in greater detail in conjunction with FIG. 3.

Figure 2:
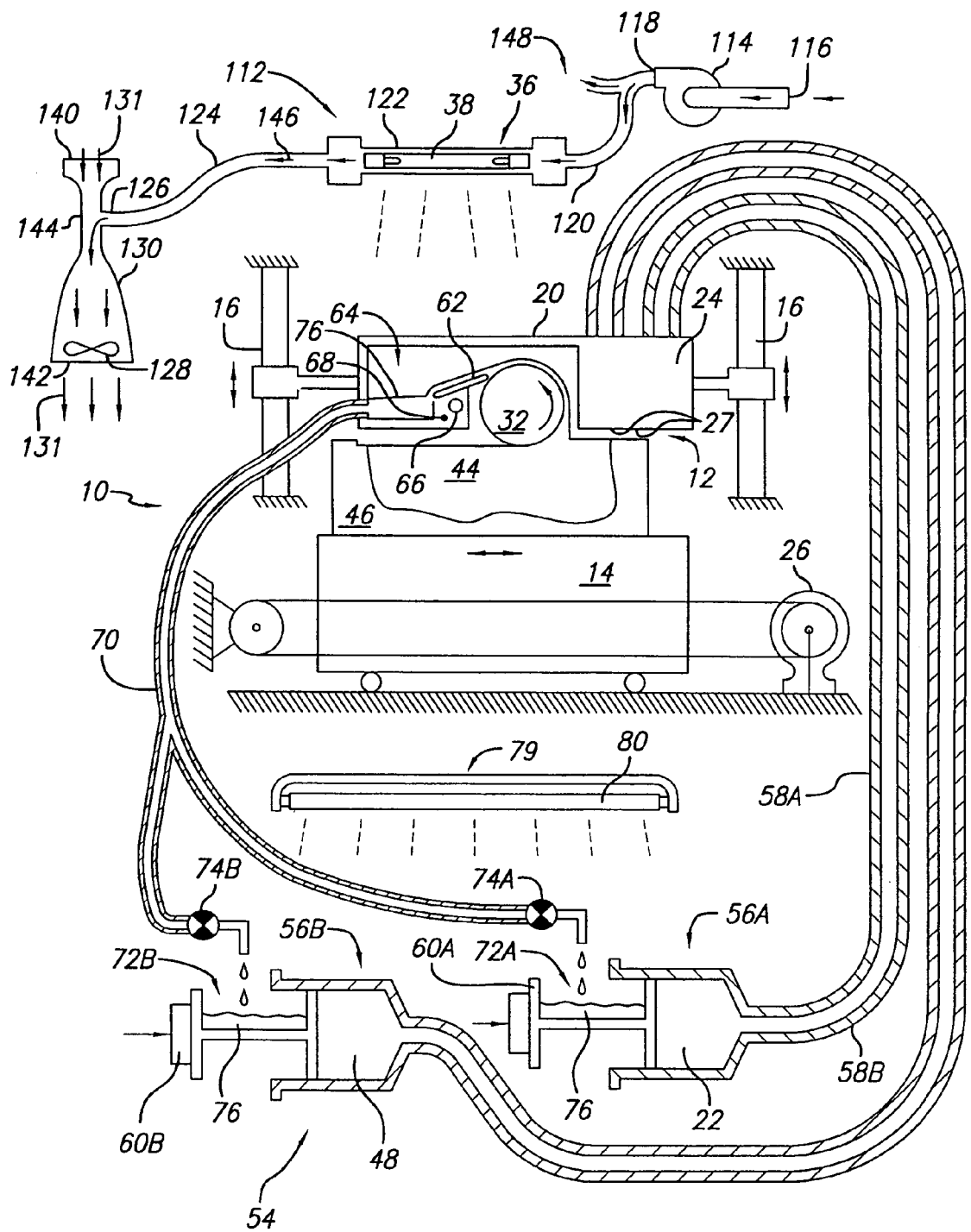
FIG. 2 is a diagrammatic side view of a preferred solid deposition modeling apparatus incorporating the cooling system of the present invention.

Referring to FIG. 2 there is illustrated generally by the numeral 10 a preferred embodiment of the SDM system having a flash exposure system illustrated generally by numeral 36, and the cooling system 112 of the present invention. The flash exposure system 36 is the same as in the SDM apparatus 10 of FIG. 1. This SDM apparatus 10 in FIG. 2 is shown including schematically a material feed and waste system illustrated generally by numeral 54. In contrast to the SDM apparatus shown in FIG. 1, the build platform 14 in this apparatus is reciprocally driven by the conventional drive means 26 instead of the dispensing trolley 20. The dispensing trolley 20 is precisely moved by actuation means 16 vertically to control the thickness of the layers of the object. Preferably, the actuation means 16 comprises precision lead screw linear actuators driven by servomotors. The ends of the linear actuators 16 reside on opposite ends of the build environment 12 and in a transverse direction to the direction of reciprocation of the build platform. However, for ease of illustration in FIG. 2 they are shown in a two-dimensionally flat manner giving the appearance that the linear actuators are aligned in the direction of reciprocation of the build platform 14. Although they may be aligned with the direction of reciprocation, it is preferred they be situated in a transverse direction so as to optimize the use of space within the apparatus.

In the build environment generally illustrated by numeral 12, there is shown by numeral 44 a three-dimensional object being formed with integrally formed supports 46. The curable phase change build material identified by numeral 22 is dispensed by the apparatus 10 to form the three-dimensional object 44, and the non-curable phase change material identified by numeral 48 is dispensed to form the support 46. Containers identified generally by numerals 56A and 56B, respectively, hold a discrete amount of these two materials 22 and 48. Umbilicals 58A and 58B, respectively, deliver the material to the print head 24. The materials 22 and 48 are heated to a flowable state, and heaters (not shown) are provided on the umbilicals 58A and 58B to maintain the materials in the flowable state as they are delivered to the print head 24. When the print head 24 needs additional material 22 or 48, extrusion bars 60A and 60B are respectively engaged to extrude the material from the containers 56A and 56B, through the umbilicals 58A and 58B, and to the print head 24.

The dispensing trolley 20 shown in FIG. 2 carries the heated planarizer 32 in contrast to the embodiment in FIG. 1. The planarizer 32 removes the excess flowable material as the planarizer rotates, which brings the material up to the skive 62 which is in contact with the planarizer 32. The skive 62 separates the material from the surface of the planarizer 32 and directs the flowable material into a waste reservoir, identified generally by numeral 64 located on the trolley 20. A heater 66 and thermistor 68 on the waste reservoir 64 operate to maintain the temperature of the waste reservoir at a sufficient point so that the waste material in the reservoir remains in the flowable state.

The waste reservoir is connected to a heated waste umbilical 70 for delivery of the waste material to the waste receptacles 72A and 72B. For each waste receptacle 72A and 72B, there is associated a solenoid valve 74A and 74B, for regulating the delivery of waste material to the waste receptacles, however other regulation configurations could be used. A detailed discussion of the feed and waste system is disclosed in U.S. patent application Ser. No. 09/970,956 assigned to the assignee of the present invention.

In FIG. 2 an additional flash exposure system is generally shown by numeral 79 and is represented schematically as lamp or bulb 80. The flash exposure system 79 is provided separately to expose the waste material in the waste receptacles to radiation to cure the waste material in the waste receptacles. It is to be appreciated that these flash exposure systems, 36 and 79, generate a significant amount of localized heat, which may be removed with the cooling system 112 of the present invention.

Figure 3:
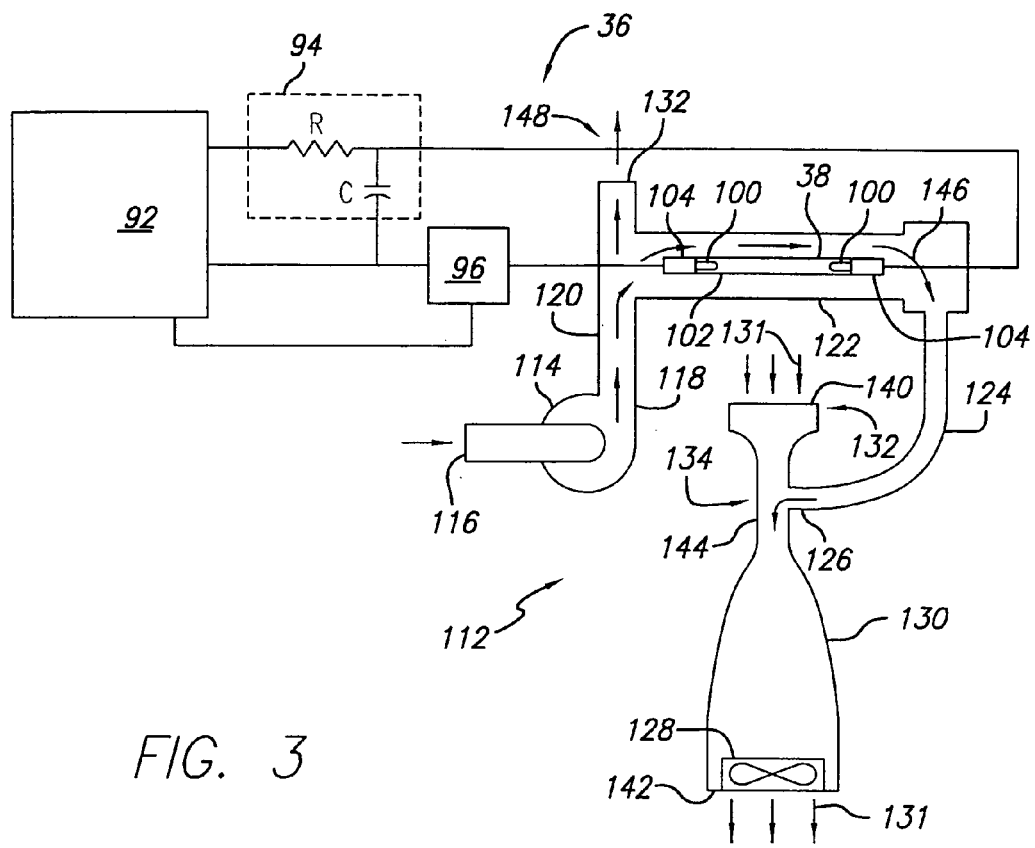
FIG. 3 is an electrical schematic of a flash exposure system incorporating the cooling system of the present invention.

Referring now to FIG. 3, an electrical schematic is provided of the flash exposure system identified generally by numeral 36, which incorporates the present invention cooling system 112. The flash exposure system 36 utilizes a xenon flash lamp 38 which emits a large amount of spectral energy (radiation) in short duration pulses. A DC power supply 92 provides direct current voltage to both the pulse forming network 94 and the trigger 96. The power supply 92 is provided with AC power and converts this to DC power for use by the flash exposure system 36. The power supply 92 was produced by Kaiser Systems, Inc., of Beverly, Mass. The pulse forming network 94 was produced by PerkinElmer Optoelectronics of Salem, Mass. Flashing of the xenon lamp is initiated by the trigger 96, which creates a voltage gradient (Volts/Inch) in the xenon gas in the lamp that causes ionization. The trigger 96 is a series induction trigger produced by PerkinElmer Optoelectronics under the designation TR-204 series injection transformer. The xenon flash lamp 38 comprises a thermally matched hollow quartz glass tube 102 and sealed electrode ends 104, which encapsulate the xenon gas in the lamp. Tungsten electrodes 100 reside in the glass tube 102 and are approximately 10 inches apart. The lamp 38 is contained in chamber 122, which is configured to reduce electromagnetic irradiation and allow a cooling stream of air 146 to flow across the lamp 38. The xenon flash lamp was produced by PerkinElmer Optoelectronics for 3D Systems, Inc. as part number FXQG-1700-10. A detailed discussion of the flash exposure system 36 is disclosed in U.S. patent application Ser. No. 10/140,426 assigned to the assignee of the present invention.

The duty cycle for the flash exposure system 36 discussed above, when operated in the SDM apparatus 10 of FIG. 2, is between about 4.1% to about 25%. Thus, the flash system is off approximately about 95.9% (100%–4.1%) to about 75% (100%–25%) of the time it takes to complete a layer. The xenon lamp 38 is believed to produce somewhere between about 400 to about 500 watts of heat when it is on. Calculations from temperature and air flow measurements made in laboratory testing determined that the steady state heat removal rate per cycle is about 70 watts per cycle. This is a significant amount of heat considering the surface area of the xenon lamp 38 is only 5.98 square inches. Thus, the targeted steady state heat removal rate for the cooling system was determined to be at least about 70 Watts.

Laboratory testing was done using a pulsed flash exposure system sold under the designation TDS606 RC-600 available from Xenon Corporation, of Woburn, Mass. This system has an input power requirement of about 600 watts, and operates at about 2250 V dc with a capacitance of 2 about microferrads (µf) at a pulse width of 25 µs. This system uses a 10-inch long xenon gas flash lamp but has no cooling system. Initial tests revealed that a cooling system was needed as the system would shut down when operated at the duty cycle required for SDM. An air cooling system was configured with a cooling duct surrounding the lamp. Air velocity was adjusted until steady state operation of the flash exposure system was achieved. Steady state measurements were then made. The air velocity (v) was measured to be 1100 feet-per-minute, the air duct diameter (d) 0.75 inches, the air duct cross-section area (A) 0.4418 inches squared, and the inlet and exit temperatures measured to be 25° C. and 52.5° C. Using the equation for heat removal rate (P) of a heat transfer system which is the mass flow rate of air ($\dot{m}$) times the specific heat of air ($C_p$) times the difference in temperature air rise from inlet to exit ($\Delta T$), i.e.

$$P=\dot{m}C_p\Delta T\text{(Watts)}$$

The mass flow rate of air ($\dot{m}$) can be determined by the air density ($\rho$) times the volume flow rate of air (F), i.e.

$$\dot{m}=\rho F$$

where the volume flow rate of air (F) is determined by the air velocity (v) and cross-sectional area of the flow (A)

$$F=vA$$

For air, the air density ($\rho$) is 1.18 (Kg/m³) at 25° C. and the specific heat of air ($C_p$) is 1005.7 (J/kg-K). From these values the heat transfer rate was calculated to about 70.6 watts and the volume flow rate was calculated to be 3.37 cubic feet per minute (CFM). At an air velocity (v) of 1450 feet-per-minute, which was also measured, the volume flow rate was calculated to be about 4.4 CFM. Thus, a minimum allowable air flow rate for providing sufficient steady state cooling by convection was determined to be about 3.3 CFM. Preferably the air flow rate is between about 3.3 CFM and about 8.0 CFM, and more preferably between about 4.0 CFM to about 5.0 CFM since these higher flow rates will lower the steady state temperature of the lamp 38.

With the minimum allowable air flow rate determined, it was investigated whether an air moving device such as an axial fan and associated ducting could be used to deliver this air flow across the flash lamp. An initial pressure drop due to ducting loss was calculated to be about 0.51 inches of water assuming air moving at 4.6 CFM through a 10 foot length of straight tubing at a diameter of 0.875 inches. Thus, it is believed that, at a minimum, the pressure drop will be at least about 0.51 In $H_2O$ at the lowest viable cooling air flow rate of about 3.3 CFM. However, more severe pressure drops will be present other than losses due to straight ducting, such as the losses in sharp angular ducting turns, necking down of the fan cowling, air friction, and other restrictions. These losses, often referred to as head loss, are difficult to determine precisely but are generally related to the square of the velocity of the air flow traveling through the ducting. It was anticipated that these additional pressure drops would be about 5 times greater than the pressure drop calculated in the straight ducting. Thus, it was decided that an overall pressure drop of between about 1 to about 2.5 inches of water (In $H_2O$) would be present. This pressure drop must be overcome by any air-moving device at the desired flow rate in order to establish the desired air flow rate. However, due to the flat performance curves (head loss vs. CFM) of axial fans, a suitable axial fan was not found that was able to deliver 4.6 CFM of air flow at a head loss of between about 1 to about 2.5 In $H_2O$. Other air-moving devices, such as positive displacement pumps, which have steep performance curves (head loss vs. CFM), are available to meet these requirements, but they are undesirably expensive, noisy and bulky. Thus it was decided to instead develop some way in which an axial fan could be used to achieve the desired air flow and head loss requirements. This was accomplished according to the present invention by providing a low-pressure zone in a venturi duct to draw air into the low-pressure zone.

Referring back to FIG. 3, the cooling system 112 establishes a low-pressure zone at port 126 in the venturi duct 130 from a first flow of air 131 created by an air-moving device 128. The low-pressure zone at port 126 is sufficient to draw a second flow of cooling air through the chamber 122 at about 4.6 CFM. To achieve this, the pressure drop at port 126 (compared to atmospheric pressure) needed to be between about 1 to about 2.5 In $H_2O$. In addition, this had to be achieved while still providing a desired ventilation air flow rate for the ventilation system. For the SDM apparatus 10 of FIG. 2, the desired ventilation air flow rate is between about 80 CFM to about 300 CFM, and more preferably between about 135 CFM to about 250 CFM. Numerous fan and venturi combinations can be used to achieve the desired pressure drop and flow rate. In order to select a specific combination, a combined fan and venturi performance curve was generated for each combination.

The combined fan and venturi performance curves were developed by first fitting the fan performance curve data into a mathematical expression available for iterative calculations. The fan performance curve provides data of the volumetric flow rate that the fan can achieve (CFM) for a given induced head loss (In $H_2O$). Next, Bernoulli's equation for incompressible steady-flow between two regions, modified to account for real world losses, was used. The first region 1 represents the venturi inlet, identified by numeral 132 in FIG. 3, and the second region 2 represents the venturi throat, identified by numeral 134 in FIG. 3. Bernoulli's equation, assuming ideal flow is:

$$\tfrac{1}{2}V_1^2 + \rho_1 g_1 h_1 + P_1/\gamma_1 = \tfrac{1}{2}V_2^2 + \rho_2 g_2 h_2 + P_2/\gamma_2$$

and assuming $\rho_1\, g_1\, h_1$ is equal to $\rho_2\, g_2\, h_2$, and that $\gamma_1$ and $\gamma_2$ are the same, and including real losses the equation reduces to:

$$\tfrac{1}{2}V_1^2 + P_1/\gamma = \tfrac{1}{2}V_2^2 + P_2/\gamma - hl_{1-2}$$

or more conveniently into:

$$(V_2^2 - V_1^2)/2 = (P_1 - P_2)/\gamma + hl_{1-2}$$

Where (V) is velocity, (P) pressure, ($\gamma$) specific weight of air, and (hl) is head loss. For initial iteration purposes head loss (hl) was determined to be directly proportional to velocity, was selected to be about at 10% loss. The diameter of region 1 was fixed at 3 inches and the above equation was iterated for a range of venturi diameters of region 2. For each venturi diameter of region 2, the equation was iterated and adjusted until the equation balanced. For each venturi diameter of region 2, a vacuum pressure (In $H_2O$) was calculated at volumetric flow rate (CFM) for the air-moving device 128 which is preferably a fan. An example of fan performance data of an exemplary fan is provided in TABLE 1 and the data determined for each venturi diameter with the exemplary fan is provided in TABLE 2.

TABLE 1

| Volumetric Flow Rate (CEM) | Fan Head Loss (In $H_2O$) |
|---|---|
| 0.0 | 1.25 |
| 25.0 | 1.17 |
| 50.0 | 1.05 |
| 75.0 | 0.88 |
| 100.0 | 0.60 |
| 117.0 | 0.30 |
| 130.0 | 0.00 |

TABLE 2

| Volumetric Flow Rate (CFM) | Inlet Diameter $D_1$ (inches) | Throat Diameter $D_2$ (inches) | Pressure Drop (In $H_2O$) |
|---|---|---|---|
| 127.8 | 3.0 | 3.0 | -0.08 |
| 126.6 | 3.0 | 2.8 | 0.03 |
| 124.8 | 3.0 | 2.6 | 0.18 |
| 122.2 | 3.0 | 2.4 | 0.38 |
| 118.7 | 3.0 | 2.2 | 0.67 |
| 113.7 | 3.0 | 2.0 | 1.05 |
| 106.6 | 3.0 | 1.8 | 1.57 |
| 96.8 | 3.0 | 1.6 | 2.23 |
| 84.1 | 3.0 | 1.4 | 2.99 |
| 68.4 | 3.0 | 1.2 | 3.78 |
| 51.2 | 3.0 | 1.0 | 4.46 |
| 42.6 | 3.0 | 0.9 | 4.73 |

Figure 4:
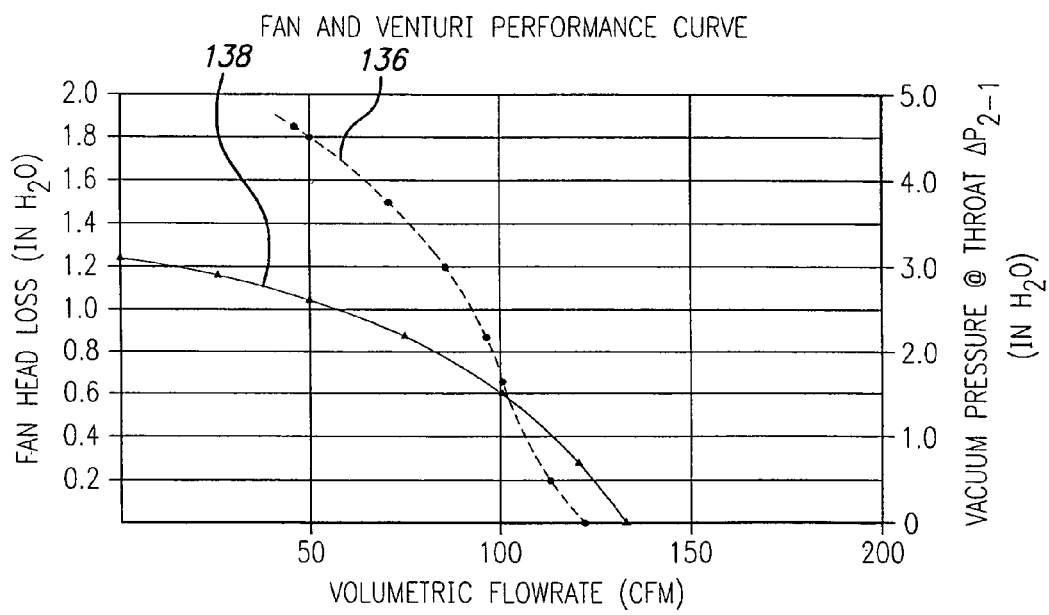
FIG. 4 is a plot of a fan and venturi performance curve associated with a given fan that can be used according to the present invention to select a desired venturi configuration for use with the fan.

Now referring to FIG. 4, a fan and venturi performance curve is plotted from the data shown in TABLES 1 and 2. The fan in this example is an axial fan available from EBM Industries, Inc., of Farmington, Conn., sold under the part number EBM G1G120-AB17-52. To use this plot to size the venturi for this fan, one selects the throat vacuum pressure desired from the right of the chart and follows this to the venturi curve line, identified by numeral 136. For purposes of illustration, assuming a vacuum pressure of 3.0 In $H_2O$ is desired, the volumetric flow rate of the venturi fan configuration will be about 86 CFM, and at this flow rate the fan head loss will be about 0.78 measured from the intersection of this CFM value and the fan curve line measured to the left of the chart. The fan curve line is identified by numeral 138. If the vacuum pressure of 1.5 In $H_2O$ were desired, the volumetric flow rate would be about 100 CFM and the head loss of the fan about 0.6 In $H_2O$. If neither of these volumetric flow rates is sufficient for ventilation purposes, the fan and venturi performance data of another configuration can be used, and so on, until an optimized configuration is obtained.

It is to be appreciated that any air-moving device and venturi performance data can be developed for use in sizing a combination for practicing the present invention. The air-moving device may be an axial fan, a centrifugal fan, a mixed flow fan, a cross flow fan, and combinations thereof. Also, a positive displacement pump could be used, if desired.

Figure 5:
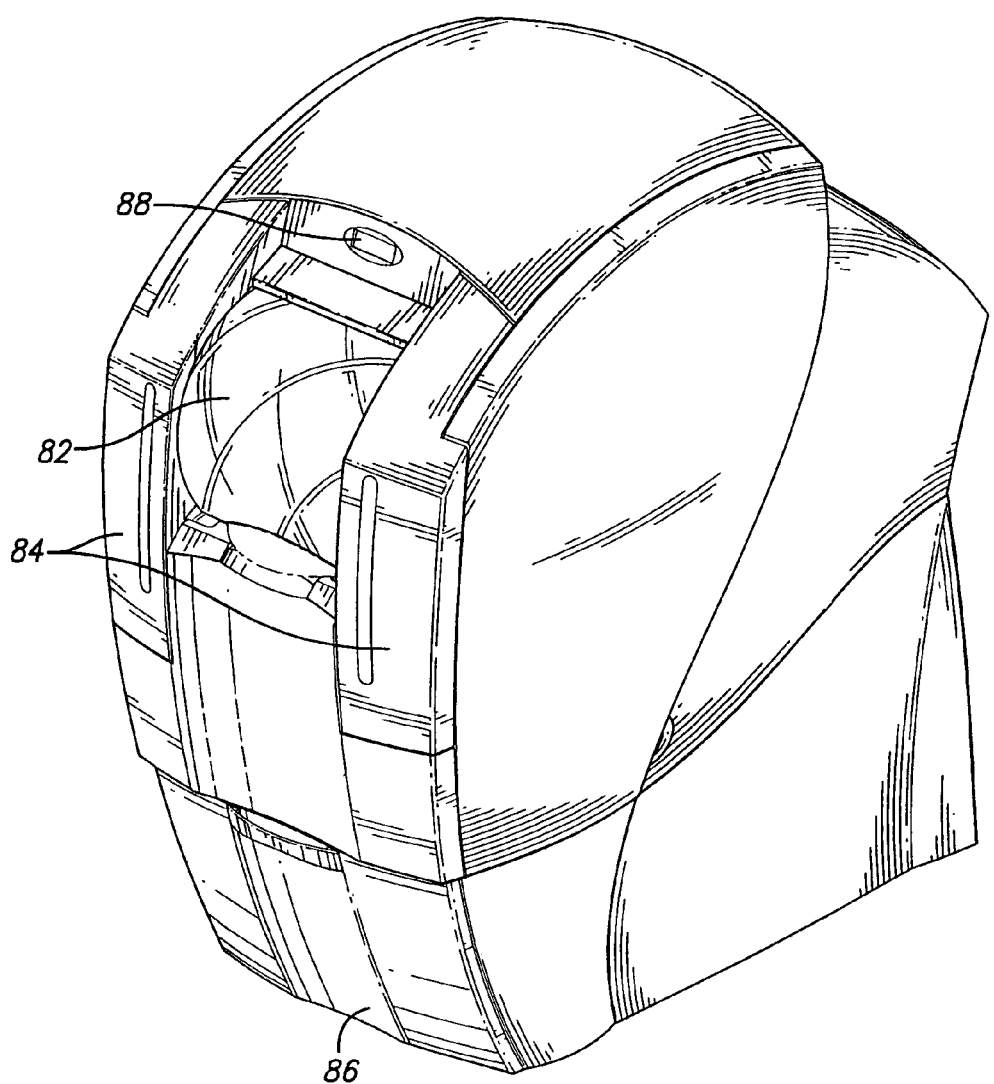
FIG. 5 is an isometric view of the apparatus of FIG. 2 for practicing the present invention.

Now referring to FIG. 5, the SDM apparatus schematically shown in FIG. 2 is shown as 10. To access the build environment, a slideable door 82 is provided at the front of the apparatus. The door 82 does not allow radiation within the machine to escape into the environment. The apparatus is configured such that it will not operate or turn on with the door 82 open. In addition, when the apparatus is in operation, the door 82 will not open. Material feed doors 84 are provided so that the curable phase change material can be inserted into the apparatus through one door 84 and the non-curable phase change material can be inserted into the apparatus through the other. A waste drawer 86 is provided at the bottom end of the apparatus 10 so that the expelled waste material can be removed from the apparatus. A user interface 88 is provided which is in communication with the external computer previously discussed which tracks receipt of the print command data from the external computer.

All patents and other publications cited herein are incorporated by reference in their entirety. What has been described are preferred embodiments in which modifications and changes may be made without departing from the spirit and scope of the accompanying claims.

What is claimed is:

1. A selective deposition modeling apparatus for forming a three-dimensional object from a curable material in a build chamber, the apparatus receiving data corresponding to layers of the three-dimensional object, the apparatus comprising:

a support platform affixed to the apparatus for supporting the three-dimensional object in the build environment;

a dispensing means affixed to the apparatus and in communication with the support platform for dispensing the curable material in the build chamber according to the computer data to form the layers of the three-dimensional object;

a flash exposure device affixed to the apparatus in the build chamber for curing the dispensed material, the flash exposure device being in communication with the support platform; and, a cooling system for providing steady state cooling of the flash exposure device, the cooling system comprising:

a) an air-moving device creating a first flow of air;

b) a venturi duct connected to the air moving device having an inlet end, an exit end, and a restriction chamber between the inlet end and the exit end, the venturi duct receiving the first flow of air at the inlet end and exhausting the flow of air at the exit end, the flow of air establishing a low-pressure zone in the restriction chamber;

c) a port in communication with the restriction chamber and operatively engaging the low-pressure zone, the port drawing a second flow of air into the venturi duct through the restriction chamber and the low pressure zone therein so that the port draws air across the flash exposure device, and wherein the low pressure zone in the restriction chamber draws the second flow of air across the flash exposure device at a flow rate that substantially provides steady state cooling of the flash exposure device.

2. The apparatus of claim 1 further comprising ducting between the flash exposure device and the restriction chamber through which the second air flow passes and in which the second flow of air has an associated pressure drop between the heat generating device and the restriction chamber, wherein the air-moving device is unable to achieve a flow rate substantially equal to the flow rate of the second flow of air at a head loss substantially equal to or greater than the associated pressure drop of the second flow of air.

3. The apparatus of claim 1 wherein the first flow of air does not pass over the flash exposure device.

4. The apparatus of claim 1 wherein the port is connected externally to the apparatus to draw air from outside the selective deposition modeling apparatus to establish the second flow of air.

5. The apparatus of claim 1 wherein the port draws air from inside the selective deposition modeling apparatus and through a filter to establish the second flow of air.

6. The apparatus of claim 1 wherein the flash exposure device generates steady state heat, the cooling system removing the steady state heat.

7. The apparatus of claim 6 wherein the flash exposure device includes a radiation emitting lamp that generates the heat removed by the cooling system.

8. The apparatus of claim 1 wherein the air-moving device is at least one fan selected from the group consisting of an axial fan, a centrifugal fan, a mixed flow fan, a cross flaw fan, and combinations thereof.

* * * * *